(12) United States Patent
Gerber et al.

(10) Patent No.: US 10,339,089 B2
(45) Date of Patent: Jul. 2, 2019

(54) ENHANCED COMMUNICATIONS OVER A UNIVERSAL SERIAL BUS (USB) TYPE-C CABLE

(71) Applicant: QUALCOMM Incorporated, San Diego, CA (US)

(72) Inventors: Nir Gerber, Haifa (IL); Itamar Berman, Kerem Maharal (IL); Yair Cassuto, Haifa (IL); Lalan Jee Mishra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 14/924,844

(22) Filed: Oct. 28, 2015

(65) Prior Publication Data

US 2017/0124016 A1    May 4, 2017

(51) Int. Cl.
  *G06F 13/42*    (2006.01)
  *G06F 13/40*    (2006.01)
  *G06F 13/38*    (2006.01)

(52) U.S. Cl.
  CPC ........ *G06F 13/4282* (2013.01); *G06F 13/385* (2013.01); *G06F 13/4068* (2013.01)

(58) Field of Classification Search
  CPC .................................................. G06F 13/4282
  See application file for complete search history.

(56) References Cited

U.S. PATENT DOCUMENTS

| | | | |
|---|---|---|---|
| 6,775,733 B2* | 8/2004 | Chang | G06F 13/4004 710/311 |
| 9,223,787 B2* | 12/2015 | Herman | G06F 17/30067 |
| 2013/0217274 A1 | 8/2013 | Bar-Niv et al. | |
| 2013/0336334 A1 | 12/2013 | Gilbert et al. | |
| 2015/0095620 A1* | 4/2015 | Ananthakrishnan | G06F 9/30083 712/220 |
| 2015/0212497 A1 | 7/2015 | Dunstan | |

(Continued)

OTHER PUBLICATIONS

Author Unknown, "Universal Serial Bus Type-C Cable and Connector Specification," USB 3.0 Promoter Group, Revision 1.1, Apr. 3, 2015, 180 pages.

(Continued)

*Primary Examiner* — Henry Tsai
*Assistant Examiner* — Juanito Borromeo
(74) *Attorney, Agent, or Firm* — Withrow & Terranova, PLLC (57) ABSTRACT

Enhanced communications over a Universal Serial Bus (USB) Type-C cable are disclosed. In one aspect, a link control circuit is provided in a USB host to enable one or more communication circuits in the USB host to transmit and receive protocol-specific data over a sideband use (SBU) interface according to communication protocols that may or may not be USB compliant. In another aspect, the link control circuit is provided in a USB client to enable one or more communication circuits in the USB client to transmit and receive protocol-specific data over the SBU interface according to communication protocols that may or may not be USB compliant. By configuring the USB host and the USB client to support multi-protocol communications via the SBU interface, it is possible to enable more flexible architectural design in mobile communication devices for enhanced performance and reduced costs.

26 Claims, 5 Drawing Sheets

(56) References Cited

U.S. PATENT DOCUMENTS

2016/0170914 A1\* 6/2016 Pethe .................... G06F 13/102
                                                    710/20
2016/0191313 A1\* 6/2016 Chen ................... H04L 41/0816
                                                    370/315

OTHER PUBLICATIONS

International Search Report and Written Opinion for PCT/US2016/054102, dated Jan. 19, 2017, 10 pages.
Author Unknown, "TP565982 USB Type-C and USB PD Controller, Power Switch, and High Speed Multiplexer," SLVSD02A, Texas Instruments, Mar. 2015, Revised Jun. 2015, 114 pages.
Vasudevan, Gayathri, "AN95615: Designing USB 3.1 Type-C Cables Using EZ-PD™ CCG2," Technical Document, Application Notes, Cypress Perform, Version A, Last Updated: Apr. 3, 2015, 22 pages.
International Preliminary Report on Patentability for PCT/US2016/054102, dated Oct. 9, 2017, 24 pages.

\* cited by examiner

ENHANCED COMMUNICATIONS OVER A UNIVERSAL SERIAL BUS (USB) TYPE-C CABLE

BACKGROUND

I. Field of the Disclosure

The technology of the disclosure relates generally to Universal Serial Bus (USB).

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

Peripheral devices, such as portable flash drives, audio speakers, and chargers, are often attached to the mobile communication devices for convenience and/or necessity reasons. A universal serial bus (USB) interface is an increasingly popular standard interface to connect such peripherals both outside and inside the mobile communication devices. When a peripheral device is connected to a mobile communication device via the USB interface, the peripheral device is a USB client and the mobile communication device acts as a USB host.

Over the years, USB interfaces for connecting the USB host and the USB client have evolved from bulkier legacy Type-A, Type-B, and Type A/B interfaces to a miniaturized Type-C interface. The USB Type-C interface is created especially for mobile communication devices that tend to have smaller, thinner, and lighter form factors. The USB Type-C interface enables a variety of new connectivity possibilities while retaining all of the functional benefits of the legacy USB interfaces. Hence, it may be desirable to explore new connectivity possibilities enabled by the USB Type-C interface to optimize architectural configurations in the mobile communication devices.

SUMMARY OF THE DISCLOSURE

Aspects disclosed in the detailed description include enhanced communications over a Universal Serial Bus (USB) Type-C cable. In one aspect, a USB host and a USB client each include a USB Type-C interface. The USB host or the USB client is configured to communicate USB Release 3.1 (USB 3.1) control information via a sideband use (SBU) interface in the respective USB Type-C interface. In another aspect, a link control circuit is provided in the USB host that includes the USB Type-C interface. The link control circuit in the USB host enables one or more communication circuits in the USB host to transmit and receive protocol-specific data over the SBU interface in the USB host according to communication protocols that may or may not be USB compliant. In another aspect, the link control circuit is provided in the USB client that includes the USB Type-C interface configured to couple to the USB Type-C interface in the USB host via a USB Type-C cable. The link control circuit in the USB client enables one or more communication circuits in the USB client to transmit and receive protocol-specific data over the SBU interface in the USB client according to communication protocols that may or may not be USB compliant. By configuring both the USB host and the USB client to support enhanced communications via the SBU interface, it is possible to expand data transmission over the USB Type-C cable, thus enabling more flexible architectural design in mobile communication devices for enhanced performance and reduced costs.

In one aspect, a USB host is provided. The USB host includes a USB Type-C interface configured to couple to a USB Type-C cable. The USB Type-C interface includes an SBU interface and a CC interface. The USB host also includes one or more communication circuits each configured to transmit and receive protocol-specific data based on a specified communication protocol. The USB host also includes a link control circuit communicatively coupled to the USB Type-C interface and the one or more communication circuits. The link control circuit is configured to select a communication circuit among the one or more communication circuits to transmit and receive the protocol-specific data over the SBU interface based on the specified communication protocol. The link control circuit is also configured to configure the SBU interface according to the specified communication protocol of the selected communication circuit. The link control circuit is also configured to provide the protocol-specific data received from the selected communication circuit to the SBU interface. The link control circuit is also configured to provide the protocol-specific data received from the SBU interface to the selected communication circuit.

In another aspect, a method for supporting protocol-specific communications in a USB host is provided. The method includes coupling a USB host to a USB Type-C cable. The method also includes selecting a communication circuit among one or more communication circuits each configured to transmit and receive protocol-specific data based on a specified communication protocol. The method also includes configuring an SBU interface to communicate the protocol-specific data according to the specified communication protocol of the selected communication circuit. The method also includes providing the protocol-specific data received from the selected communication circuit to the SBU interface. The method also includes providing the protocol-specific data received from the SBU interface to the selected communication circuit.

In another aspect, a USB client is provided. The USB client includes a USB Type-C interface configured to couple to a USB Type-C cable. The USB Type-C interface includes an SBU interface and a CC interface. The USB client also includes a USB 3.1 controller configured to communicate a USB 3.1 control information via the SBU interface.

In another aspect, a USB client is provided. The USB client includes a USB Type-C interface configured to couple to a USB host via a USB Type-C cable. The USB Type-C interface includes an SBU interface and a CC interface. The USB client also includes one or more communication circuits each configured to transmit and receive protocol-specific data based on a specified communication protocol. The USB client also includes a link control circuit communicatively coupled to the USB Type-C interface and the one or more communication circuits. The link control circuit is configured to select a communication circuit among the one or more communication circuits to transmit and receive the protocol-specific data over the SBU interface based on the specified communication protocol. The link control circuit is also configured to configure the SBU interface according to the specified communication protocol of the selected communication circuit. The link control circuit is also configured to provide the protocol-specific data received from the selected communication circuit to the SBU interface. The link control circuit is also configured to provide the protocol-specific data received from the SBU interface to the selected communication circuit.

In another aspect, a USB host is provided. The USB host includes a USB Type-C interface configured to couple to a USB Type-C cable. The USB Type-C interface includes an SBU interface and a configuration channel (CC) interface. The USB host also includes a USB 3.1 controller configured to communicate a USB 3.1 control information via the SBU interface.

In another aspect, a method for supporting protocol-specific communications in a USB client is provided. The method includes coupling a USB client to a USB Type-C cable. The method also includes selecting a communication circuit among one or more communication circuits each configured to transmit and receive protocol-specific data based on a specified communication protocol. The method also includes configuring an SBU interface to communicate the protocol-specific data according to the specified communication protocol of the selected communication circuit. The method also includes providing the protocol-specific data received from the selected communication circuit to the SBU interface. The method also includes providing the protocol-specific data received from the SBU interface to the selected communication circuit.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include enhanced communications over a Universal Serial Bus (USB) Type-C cable. In one aspect, a USB host and a USB client each include a USB Type-C interface. The USB host or the USB client is configured to communicate USB Release 3.1 (USB 3.1) control information via a sideband use (SBU) interface in the respective USB Type-C interface. In another aspect, a link control circuit is provided in the USB host that includes the USB Type-C interface. The link control circuit in the USB host enables one or more communication circuits in the USB host to transmit and receive protocol-specific data over the SBU interface in the USB host according to communication protocols that may or may not be USB compliant. In another aspect, the link control circuit is provided in the USB client that includes a USB Type-C interface configured to couple to the USB Type-C interface in the USB host via the USB Type-C cable. The link control circuit in the USB client enables one or more communication circuits in the USB client to transmit and receive protocol-specific data over the SBU interface in the USB client according to communication protocols that may or may not be USB compliant. By configuring both the USB host and the USB client to support enhanced communications via the SBU interface, it is possible to expand data transmission over the USB Type-C cable, thus enabling more flexible architectural design in mobile communication devices for enhanced performance and reduced costs.

Before discussing exemplary aspects of enhanced communications over a USB Type-C cable that include specific aspects of the present disclosure, a brief overview of USB Type-C plug pin layouts, as defined by the USB Type-C Cable and Connector Specification Release 1.1 (hereinafter USB Type-C specification) published by the USB Promotion Group on Apr. 3, 2015, is first provided in FIG. 1. The discussion of specific exemplary aspects of enhanced communications over USB Type-C cable starts below with reference to FIG. 2.

Figure 1:
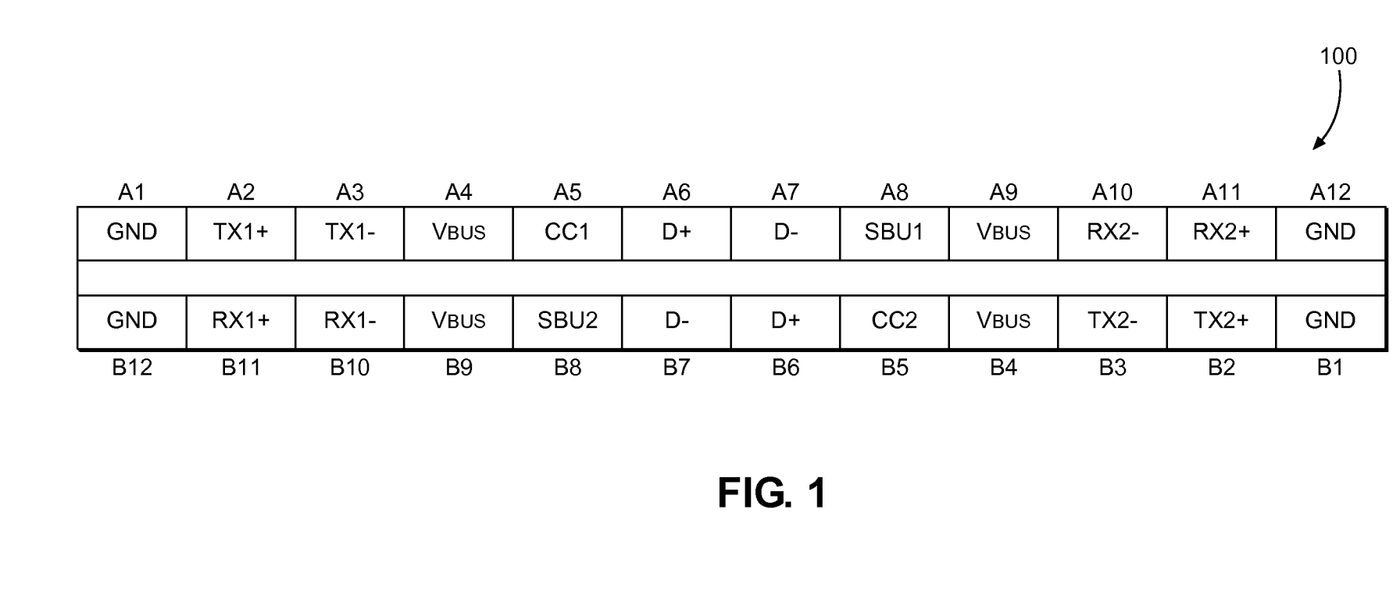
FIG. 1 is a schematic diagram of an exemplary conventional Universal Serial Bus (USB) Type-C receptacle interface as defined in the USB Type-C Cable and Connector Specification Release 1.1 (USB Type-C specification)

In this regard, FIG. 1 is a schematic diagram of an exemplary USB Type-C receptacle interface 100 as defined in the USB Type-C specification. The USB Type-C receptacle interface 100 includes twenty-four (24) pins that are labeled from A1 to A12 and B1 to B12. The pins A1 to A12 are disposed from right to left while the pins B1 to B12 are disposed from left to right. Among the 24 pins, pins A4, A9, B4, and B9 are bus power ($V_{BUS}$) pins that provide a path to deliver power between a USB host (not shown) and a USB client (not shown). Pins A5 and B5 are configuration channel (CC) pins that are used to detect connections and configure interfaces across a USB Type-C cable (not shown). Pins A6, A7, B6, and B7 are high-speed data pins for implementing functionalities defined in the USB Release 2.0 specification (USB 2.0). Pins A2, A3, B2, and B3 are super speed data transmit (TX) pins to implement a USB Release 3.1 (USB 3.1) SuperSpeed transmit interface. Pins A10, A11, B10, and B11 are super speed data receive (RX) pins to implement a USB 3.1 SuperSpeed receive interface. Pins A8 and B8 are SBU pins that may be configured to support additional functionalities that are not specified by the USB Type-C specification. As such, it is possible to reconfigure the SBU pins in the USB Type-C receptacle interface 100 to support a variety of enhanced communications.

Figure 2:
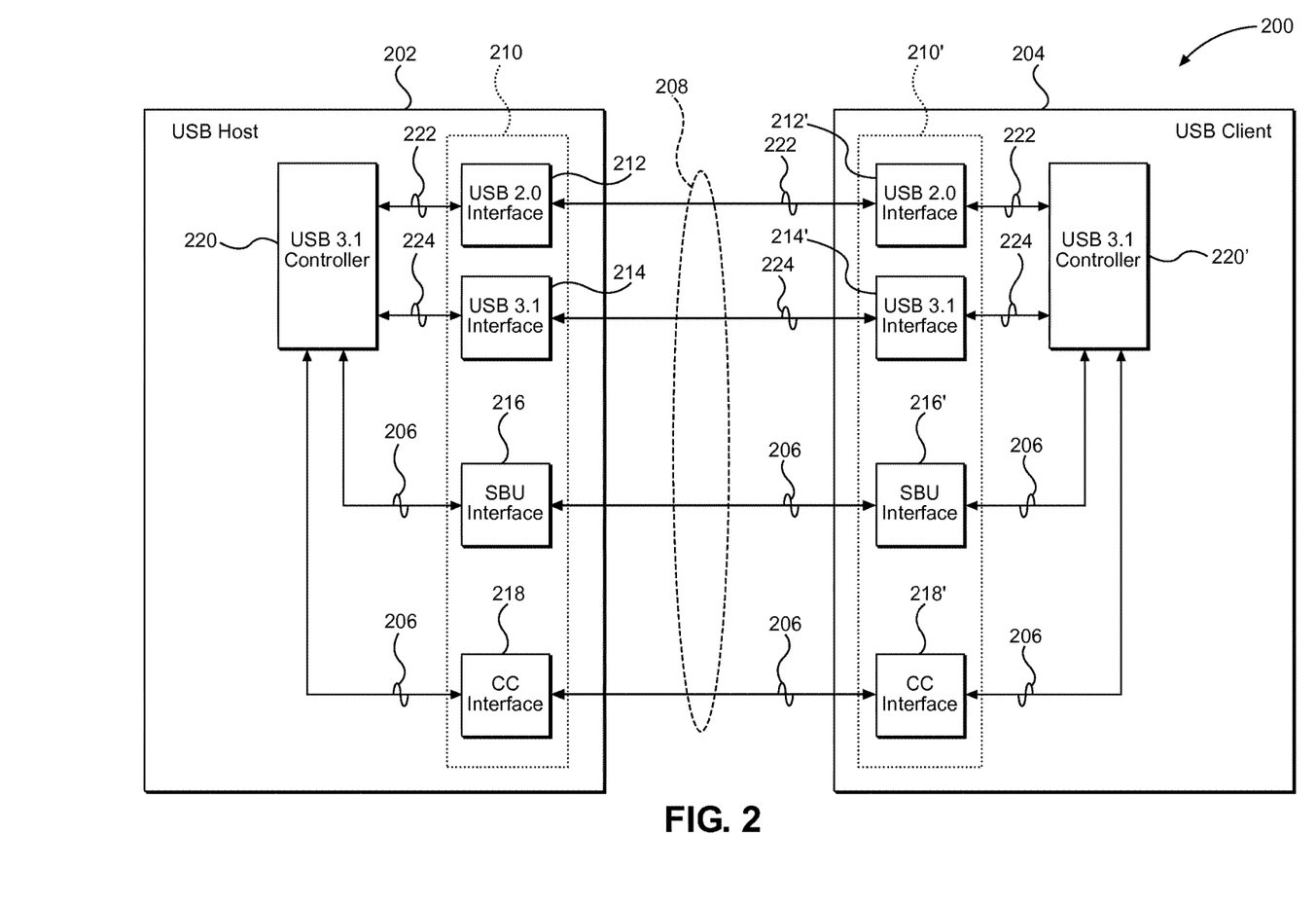
FIG. 2 is a schematic diagram of an exemplary USB system in which a USB host and a USB client are configured to exchange a USB Release 3.1 (USB 3.1) control information over a USB Type-C cable.

In this regard, FIG. 2 is a schematic diagram of an exemplary USB system 200 in which a USB host 202 and a USB client 204 are configured to exchange a USB 3.1 control information 206 over a USB Type-C cable 208. Elements of FIG. 1 are referenced in connection with FIG. 2 and will not be re-described herein.

With reference to FIG. 2, the USB host 202 includes a USB Type-C interface 210, which may be the USB Type-C receptacle interface 100 of FIG. 1 in a non-limiting example. The USB Type-C interface 210 includes a USB 2.0 interface 212, a USB 3.1 interface 214, an SBU interface 216, and a CC interface 218. The USB 2.0 interface 212 includes the high-speed data pins A6, A7, B6, and B7 (not shown). The USB 3.1 interface 214 includes the super speed data TX pins A2, A3, B2, and B3 (not shown) as well as the super speed data RX pins A10, A11, B10, and B11 (not shown). The SBU interface 216 includes the SBU pins A8 and B8 (not shown). The CC interface 218 includes the CC pins A5 and B5 (not shown).

The USB host 202 also includes a USB 3.1 controller 220 configured to communicate USB high-speed data 222 and USB SuperSpeed data 224 via the USB 2.0 interface 212 and the USB 3.1 interface 214, respectively. In addition, the USB 3.1 controller 220 is configured to communicate the USB 3.1 control information 206 via the SBU interface 216 or the CC interface 218. In a non-limiting example, the USB 3.1 control information 206 may be a wakeup/resume signal for waking up the USB Type-C interface 210 from a low-power operation. The USB 3.1 control information 206 may also be a "busy" signal which can reduce rejected attempts for transmitting data or enter/exit the low-power operation. The USB 3.1 control information 206 may also be an interrupt signal to replace an existing USB Interrupt Endpoint (INT EP). The USB 3.1 control information 206 may also be a start-of-frame (SOF) signal to replace an existing USB SOF packet that typically consumes more bandwidth and power to transmit. The USB 3.1 control information 206 may also be a low-bandwidth endpoint signal that replaces an existing USB low-bandwidth command EP packet to conserve bandwidth and power.

With continuing reference to FIG. 2, the USB client 204 includes a USB Type-C interface 210', which is functionally equivalent to the USB Type-C interface 210 in the USB host 202. The USB Type-C interface 210' includes a USB 2.0 interface 212', a USB 3.1 interface 214', an SBU interface 216', and a CC interface 218' that are functionally equivalent to the USB 2.0 interface 212, the USB 3.1 interface 214, the SBU interface 216, and the CC interface 218 in the USB host 202, respectively. The USB client 204 also includes a USB 3.1 controller 220' that is functionally equivalent to the USB 3.1 controller 220 in the USB host 202. As such, the USB 3.1 controller 220' is also configured to communicate the USB 3.1 control information 206 via the SBU interface 216' or the CC interface 218'.

In addition to communicating the USB 3.1 control information 206 between the USB host 202 and the USB client 204, it may also be possible to configure the SBU interface 216 and the SBU interface 216' to communicate protocol-specific data between the USB host 202 and the USB client 204. In a non-limiting example, the protocol-specific data that may be communicated between the SBU interface 216 and the SBU interface 216' may include inter-integrated circuit (I2C) data, MIPI Alliance (MIPI) I3C$^{SM}$ (I3C) data, universal asynchronous receiver/transmitter (UART) data, serial wire debug (SWD) data, and USB Release 1.1 (USB 1.1) data.

Figure 3:
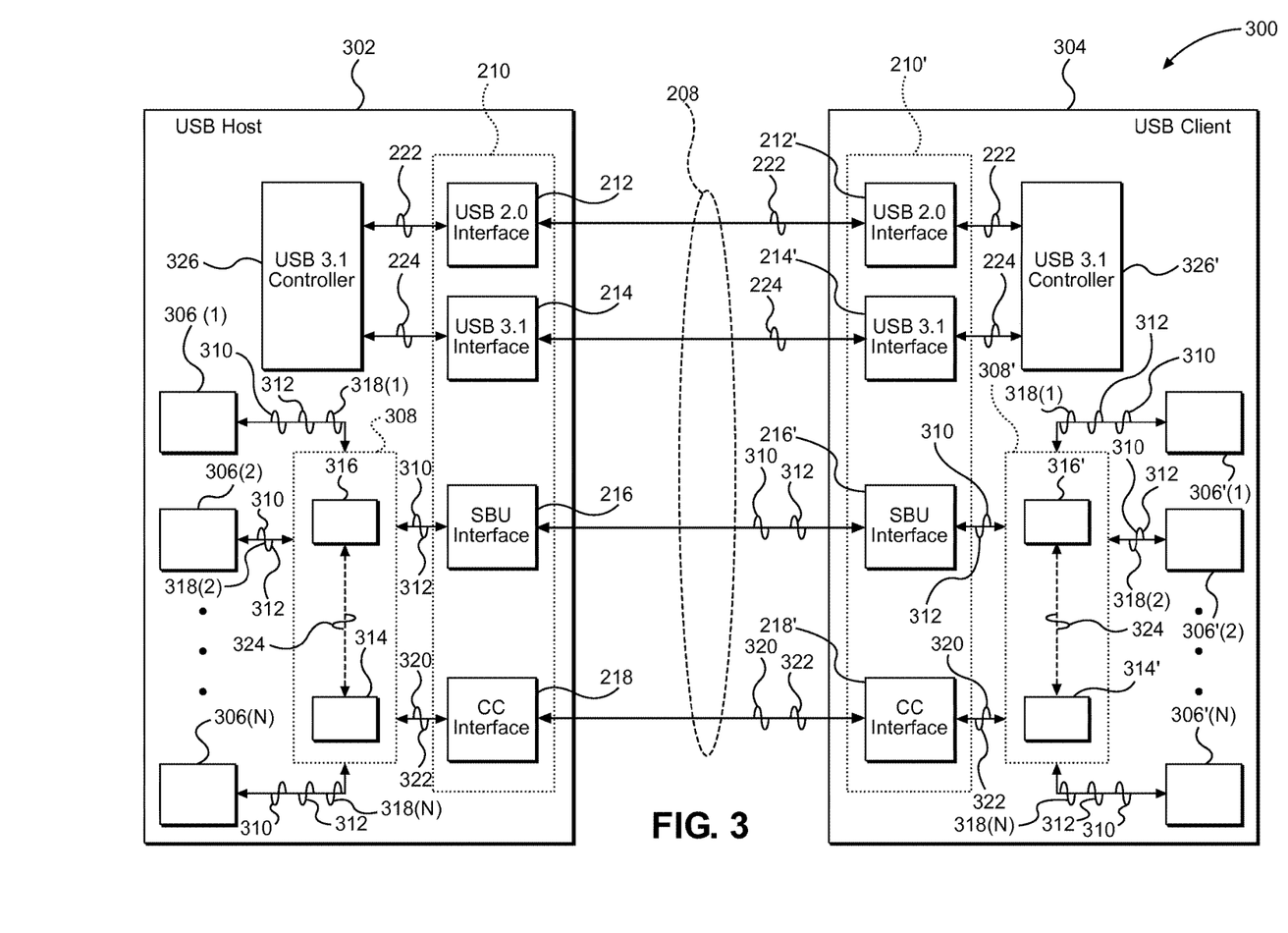
FIG. 3 is a schematic diagram of an exemplary USB system in which a USB host and a USB client are configured to exchange protocol-specific data over the USB Type-C cable of FIG. 2.

In this regard, FIG. 3 is a schematic diagram of an exemplary USB system 300 in which a USB host 302 and a USB client 304 are configured to exchange protocol-specific data over the USB Type-C cable 208 of FIG. 2. Common elements between FIGS. 2 and 3 are shown therein with common element numbers and thus, will not be re-described herein.

With reference to FIG. 3, the USB host 302 includes one or more communication circuits 306(1)-306(N) each configured to transmit and receive protocol-specific data based on a specified communication protocol. In a first non-limiting example, the one or more communication circuits 306(1)-306(N) may include an I2C circuit that is configured to transmit and receive I2C data based on an I2C communication protocol. In a second non-limiting example, the one or more communication circuits 306(1)-306(N) may include a MIPI I3C circuit that is configured to transmit and receive MIPI I3C data based on a MIPI I3C communication protocol. In a third non-limiting example, the one or more communication circuits 306(1)-306(N) may include a UART circuit that is configured to transmit and receive UART data based on a UART communication protocol. In a fourth non-limiting example, the one or more communication circuits 306(1)-306(N) may include an SWD circuit that is configured to transmit and receive SWD data based on an SWD communication protocol. In a fifth non-limiting example, the one or more communication circuits 306(1)-306(N) may include a USB 1.1 circuit that is configured to transmit and receive USB 1.1 data based on a USB 1.1 communication protocol. In addition to the specific non-limiting examples described above, it shall be appreciated that the one or more communication circuits 306(1)-306(N) may be configured to transmit and receive protocol-specific data. The I2C circuit, the MIPI I3C circuit, the UART circuit, the SWD circuit, and the USB 1.1 circuit, which can be any of the one or more communication circuits 306(1)-306(N), support lower-speed serial communications in the USB host 302. For example, the MIPI I3C circuit may be support serial communications with various sensors (not shown) and the SWD circuit may be used for debugging the USB host 302.

The one or more communication circuits 306(1)-306(N) may be integrated or packaged into same or different integrated circuits (not shown) in the USB host 302. Communications between a pair of communication circuits, for example a pair of MIPI I3C circuits, are typically carried out via a general-purpose input output (GPIO) interface. The GPIO interface provided in an integrated circuit typically includes one or more input/output (I/O) pins (not shown) that have no defined usage by default. In this regard, the one or more I/O pins may be seen as reserved I/O pins that can be reconfigured to transmit and receive the protocol-specific data based on the specified communication protocol. For example, one of the one or more I/O pins in the GPIO interface may be configured to carry the MIPI I3C data between the pair of MIPI I3C circuits based on the MIPI I3C communication protocol while another one of the one or more I/O pins in the GPIO interface is configured to carry UART data between a pair of UART circuits based on the UART communication protocol.

According to previous discussions in FIG. 1, the SBU pins A8 and B8 in the SBU interface 216 may be configured to support additional functionalities that are not specified by the USB Type-C specification. As such, it may be possible to treat the SBU pins A8 and B8 in the SBU interface 216 as reserved I/O pins similar to the one or more I/O pins in the GPIO interface. Accordingly, it may be possible to configure the SBU interface 216 to function like the GPIO interface to support protocol-specific communications between the USB host 302 and the USB client 304 over the USB Type-C cable 208.

With continuing reference to FIG. 3, the USB host 302 also includes a link control circuit 308 that is communicatively coupled to the USB Type-C interface 210 and the one or more communication circuits 306(1)-306(N). To configure the SBU interface 216 to function like the GPIO interface, the link control circuit 308 selects a communication circuit among the one or more communication circuits 306(1)-306(N) to transmit protocol-specific data 310 and receive protocol-specific data 312 over the SBU interface 216 based on the specified communication protocol of the selected communication circuit. The link control circuit 308 then configures the SBU interface 216 according to the specified communication protocol of the selected communication circuit. For example, the link control circuit 308 may select communication circuit 306(1), which may be a MIPI I3C circuit for example, to transmit and receive MIPI I3C data over the SBU interface 216 and configure the SBU interface 216 based on the MIPI I3C communication protocol. The link control circuit 308 may also provide the protocol-specific data 310 (e.g., the MIPI I3C data) received from the selected communication circuit (e.g., the MIPI I3C circuit) to the SBU interface 216 for transmission to the USB client 304 over the USB Type-C cable 208. The link control circuit 308 may also provide the protocol-specific data 312 (e.g., the MIPI I3C data) received from the SBU interface 216 to the selected communication circuit (e.g., the MIPI I3C circuit).

The link control circuit 308 may further include a link protocol selection circuit 314 and an I/O controller 316. The link protocol selection circuit 314 may be configured to select the communication circuit among the one or more communication circuits 306(1)-306(N) to transmit the protocol-specific data 310 and receive the protocol-specific data 312 over the SBU interface 216 based on the specified communication protocol. In a non-limiting example, the link protocol selection circuit 314 may receive one or more request signals 318(1)-318(N) from the one or more communication circuits 306(1)-306(N), respectively, for transmitting the protocol-specific data 310 and receiving the protocol-specific data 312 via the SBU interface 216. In another non-limiting example, the link protocol selection circuit 314 may configure a selected communication circuit, which may be any of the one or more communication circuits 306(1)-306(N), to transmit the protocol-specific data 310 and receive the protocol-specific data 312 over the SBU interface 216 according to a CC alternate mode defined in the USB Type-C specification.

Before selecting any of the one or more communication circuits 306(1)-306(N) to communicate via the SBU interface 216, the link protocol selection circuit 314 may determine whether the USB client 304 is capable of communicating the protocol-specific data 310 and the protocol-specific data 312 over the USB Type-C cable 208 by sending an interrogation signal 320 via the CC interface 218. The link protocol selection circuit 314 may receive an interrogation response signal 322 from the CC interface 218. The interrogation response signal 322 indicates whether the USB client 304 is capable of communicating the protocol-specific data 310 and the protocol-specific data 312 over the USB Type-C cable 208. If the USB client 304 is capable of communicating the protocol-specific data 310 and the protocol-specific data 312 over the USB Type-C cable 208, the link protocol selection circuit 314 may provide a notification signal 324 to the I/O controller 316. In a non-limiting example, the notification signal 324 may indicate the communication circuit among the one or more communication circuits 306(1)-306(N) that is selected for communicating the protocol-specific data 310 and 312 via the SBU interface 216.

With continuing reference to FIG. 3, in response to receiving the notification signal 324, the I/O controller 316 may configure the SBU interface 216 according to the specified communication protocol of the selected communication circuit as indicated in the notification signal 324. Subsequently, the I/O controller 316 may provide the protocol-specific data 310 received from the selected communication circuit to the SBU interface 216 for transmission to the USB client 304 over the USB Type-C cable 208. The I/O controller 316 may also provide the protocol-specific data 312 received from the SBU interface 216 to the selected communication circuit.

There may be times when multiple of the one or more communication circuits 306(1)-306(N) request access the SBU interface 216. In this regard, in a non-limiting example, the link protocol selection circuit 314 may select a plurality of communication circuits among the one or more communication circuits 306(1)-306(N) to communicate via the SBU interface 216. The I/O controller 316 may multiplex the protocol-specific data 310 corresponding to each of the plurality of selected communication circuits and provide the multiplexed protocol-specific data 310 to the SBU interface 216. The I/O controller 316 may also de-multiplex the protocol-specific data 310 received from the SBU interface 216 into a plurality of de-multiplexed protocol-specific data 310 corresponding to the plurality of communication circuits, respectively. The I/O controller 316 may then provide the plurality of de-multiplexed protocol-specific data 310 to the plurality of communication circuits, respectively. For more information about functions of the I/O controller 316, the interested reader is referred to U.S. Patent Application Ser. No. 62/112,078, filed Feb. 4, 2015, the disclosure of which is herein incorporated by reference in its entirety. The USB host 302 also includes a USB 3.1 controller 326 configured to communicate the USB high-speed data 222 and the USB SuperSpeed data 224 via the USB 2.0 interface 212 and the USB 3.1 interface 214, respectively.

With continuing reference to FIG. 3, the USB client 304 includes one or more communication circuits 306'(1)-306'(N) that are equivalent in function to the one or more communication circuits 306(1)-306(N) in the USB host 302. The USB client 304 also includes a link control circuit 308' that includes a link protocol selection circuit 314' and an I/O controller 316'. The link control circuit 308', the link protocol selection circuit 314', and the I/O controller 316' are functionally equivalent to the link control circuit 308, the link protocol selection circuit 314, and the I/O controller 316 in the USB host 302, respectively. The USB client 304 also includes a USB 3.1 controller 326' that is equivalent in function to the USB 3.1 controller 326 in the USB host 302.

With continuing reference to FIG. 3, to support the protocol-specific communications between the USB host 302 and the USB client 304 over the USB Type-C cable 208, both the USB host 302 and the USB client 304 need to be configured. In this regard, FIG. 4 is a USB host and client configuration process 400 for configuring the USB host 302 of FIG. 3 and the USB client 304 to exchange protocol-specific data over the USB Type-C cable 208.

Figure 4:
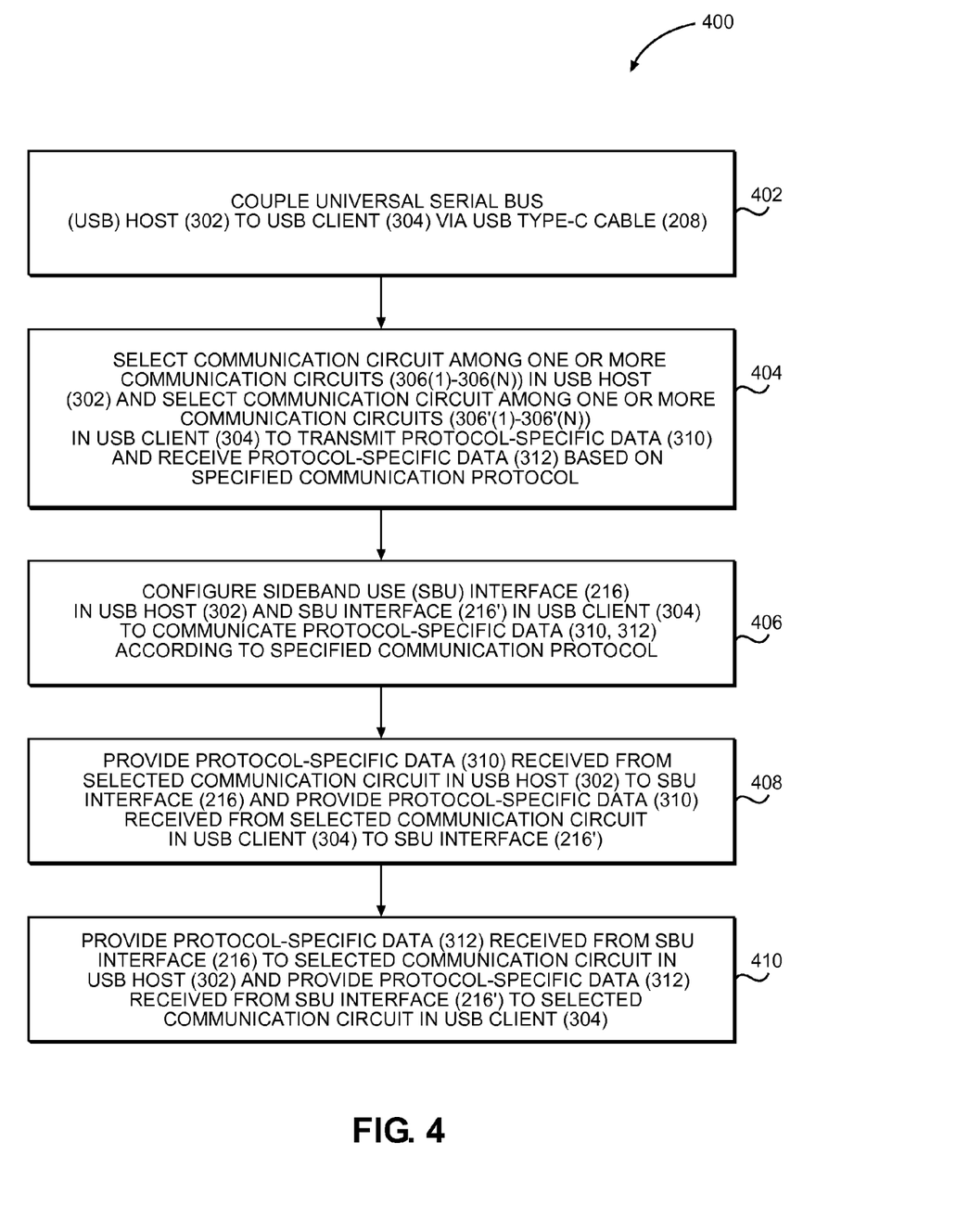
FIG. 4 is a USB host and client configuration process for configuring the USB host and the USB client of FIG. 3 to exchange the protocol-specific data over the USB Type-C cable.

With reference to FIG. 4, the USB host and client configuration process 400 involves coupling the USB host 302 to the USB client 304 via the USB Type-C cable 208 (block 402). Next, the link control circuit 308 in the USB host 302 selects a communication circuit among the one or more communication circuits 306(1)-306(N) to transmit the protocol-specific data 310 and receive the protocol-specific data 312 based on the specified communication protocol corresponding to the selected communication circuit. The link control circuit 308' in the USB client 304 selects a communication circuit among the one or more communication circuits 306'(1)-306'(N) to transmit the protocol-specific data 310 and receive the protocol-specific data 312 based on the specified communication protocol corresponding to the selected communication circuit (block 404). Next, the link control circuit 308 configures the SBU interface 216 in the USB host 302 to communicate the protocol-specific data 310 and 312 according to the specified communication protocol of the selected communication circuit. The link control circuit 308' configures the SBU interface 216' in the USB client 304 to communicate the protocol-specific data 310 and 312 according to the specified communication protocol of the selected communication circuit (block 406). The link control circuit 308 provides the protocol-specific data 310 received from the selected communication circuit in the USB host 302 to the SBU interface 216. The link control circuit 308' provides the protocol-specific data 310 received from the selected communication circuit in the USB client 304 to the SBU interface 216' (block 408). The link control circuit 308 also provides the protocol-specific data 312 received from the SBU interface 216 to the selected communication circuit in the USB host 302. The link control circuit 308' also provides the protocol-specific data 312 received from the SBU interface 216' to the selected communication circuit in the USB client 304 (block 410).

The USB host 202 and the USB client 204 of FIG. 2 and the USB host 302 and the USB client 304 of FIG. 3 according to aspects disclosed herein may be connected to any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 5:
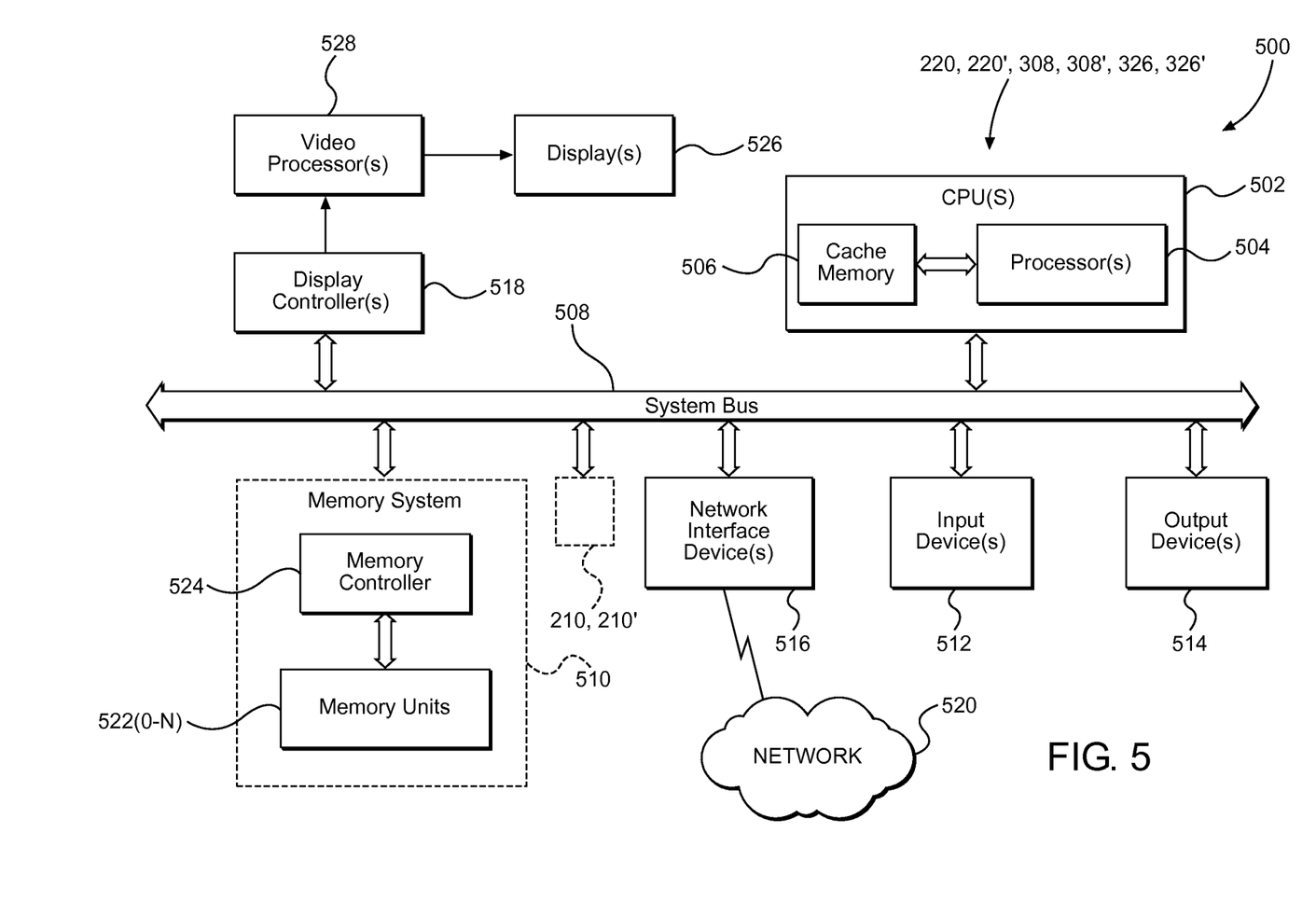
FIG. 5 is a block diagram of an exemplary processor-based system that can include the USB system of FIG. 2 and the USB system of FIG. 3.

In this regard, FIG. 5 illustrates an example of a processor-based system 500 that can communicate with the USB system 200 of FIG. 2 and the USB system 300 of FIG. 3. In this example, the processor-based system 500 includes one or more central processing units (CPUs) 502, each including one or more processors 504. The CPU(s) 502 may have cache memory 506 coupled to the processor(s) 504 for rapid access to temporarily stored data. The CPU(s) 502 is coupled to a system bus 508. As is well known, the CPU(s) 502 communicates with other devices by exchanging address, control, and data information over the system bus 508. The one or more central processing units (CPUs) 502 may be configured to function as the USB 3.1 controllers 220 and 220' of FIG. 2, the link control circuits 308 and 308' of FIG. 3, and the USB 3.1 controllers 326 and 326' of FIG. 3. Although not illustrated in FIG. 5, multiple system buses 508 could be provided, wherein each system bus 508 constitutes a different fabric.

Other master and slave devices can be connected to the system bus 508. As illustrated in FIG. 5, these devices can include a memory system 510, one or more input devices 512, one or more output devices 514, one or more network interface devices 516, one or more display controllers 518, and the USB Type-C interfaces 210 and 210' of FIGS. 2 and 3, as examples. The input device(s) 512 can include any type of input device, including, but not limited to, input keys, switches, voice processors, etc. The output device(s) 514 can include any type of output device, including, but not limited to, audio, video, other visual indicators, etc. The network interface device(s) 516 can be any device configured to allow exchange of data to and from a network 520. The network 520 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 516 can be configured to support any type of communications protocol desired. The memory system 510 can include one or more memory units 522(0-N) and a memory controller 524.

The CPU(s) 502 may also be configured to access the display controller(s) 518 over the system bus 508 to control information sent to one or more displays 526. The display controller(s) 518 sends information to the display(s) 526 to be displayed via one or more video processors 528, which process the information to be displayed into a format suitable for the display(s) 526. The display(s) 526 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A universal serial bus (USB) host, comprising:
   a USB Type-C interface configured to couple to a USB Type-C cable, wherein the USB Type-C interface comprises a sideband use (SBU) interface and a configuration channel (CC) interface;
   a plurality of communication circuits each configured to transmit and receive protocol-specific data based on a specified communication protocol; and
   a link control circuit communicatively coupled to the USB Type-C interface and the plurality of communication circuits, wherein the link control circuit is configured to:
      select a communication circuit among the plurality of communication circuits to transmit and receive the protocol-specific data over the SBU interface based on the specified communication protocol of the selected communication circuit;
      configure the SBU interface according to the specified communication protocol of the selected communication circuit;
      provide the protocol-specific data received from the selected communication circuit to the SBU interface; and
      provide the protocol-specific data received from the SBU interface to the selected communication circuit.

2. The USB host of claim 1, wherein the link control circuit is further configured to configure the selected communication circuit to transmit and receive the protocol-specific data over the SBU interface based on a CC alternate mode defined in a USB Type-C Cable and Connector Specification Release 1.1 (USB Type-C specification).

3. The USB host of claim 1, wherein:
   the plurality of communication circuits comprises an inter-integrated circuit (I2C) circuit configured to transmit and receive I2C data based on an I2C communication protocol; and
   the link control circuit is configured to configure the SBU interface to transmit and receive the I2C data according to the I2C communication protocol.

4. The USB host of claim 1, wherein:
   the plurality of communication circuits comprises a MIPI Alliance (MIPI) I3C$^{SM}$ (I3C) circuit configured to transmit and receive MIPI I3C data based on a MIPI I3C communication protocol; and
   the link control circuit is configured to configure the SBU interface to transmit and receive the MIPI I3C data according to the MIPI I3C communication protocol.

5. The USB host of claim 1, wherein:
   the plurality of communication circuits comprises a universal asynchronous receiver/transmitter (UART) circuit configured to transmit and receive UART data based on a UART communication protocol; and
   the link control circuit is configured to configure the SBU interface to transmit and receive the UART data according to the UART communication protocol.

6. The USB host of claim 1, wherein:
   the plurality of communication circuits comprises a serial wire debug (SWD) circuit configured to transmit and receive SWD data based on an SWD communication protocol; and
   the link control circuit is configured to configure the SBU interface to transmit and receive the SWD data according to the SWD communication protocol.

7. The USB host of claim 1, wherein:
   the plurality of communication circuits comprises a USB Release 1.1 (USB 1.1) circuit configured to transmit and receive USB 1.1 data based on a USB 1.1 communication protocol; and
   the link control circuit is configured to configure the SBU interface to transmit and receive the USB 1.1 data according to the USB 1.1 communication protocol.

8. The USB host of claim 1, wherein the link control circuit comprises a link protocol selection circuit configured to select the communication circuit among the plurality of communication circuits to transmit and receive the protocol-specific data over the SBU interface based on the specified communication protocol of the selected communication circuit.

9. The USB host of claim 8, wherein the link control circuit comprises an input/output (I/O) controller configured to:
   configure the SBU interface according to the specified communication protocol of the selected communication circuit;
   provide the protocol-specific data received from the selected communication circuit to the SBU interface; and
   provide the protocol-specific data received from the SBU interface to the selected communication circuit.

10. The USB host of claim 9, wherein the link protocol selection circuit is further configured to select a plurality of communication circuits among the plurality of communication circuits to transmit and receive the protocol-specific data over the SBU interface based on a plurality of specified communication protocols, respectively.

11. The USB host of claim 10, wherein the I/O controller is further configured to:

multiplex the protocol-specific data corresponding to each of the plurality of selected communication circuits and provide the multiplexed protocol-specific data to the SBU interface;

de-multiplex the protocol-specific data received from the SBU interface into a plurality of de-multiplexed protocol-specific data corresponding to the plurality of selected communication circuits, respectively; and provide the plurality of de-multiplexed protocol-specific data to the plurality of selected communication circuits.

12. A method for supporting protocol-specific communications in a universal serial bus (USB) host, comprising:

coupling a USB host to a USB Type-C cable;

selecting a communication circuit among a plurality of communication circuits each configured to transmit and receive protocol-specific data at a speed lower than USB Release 2.0 (USB 2.0) based on a specified communication protocol;

configuring a sideband use (SBU) interface to communicate the protocol-specific data according to the specified communication protocol of the selected communication circuit;

providing the protocol-specific data received from the selected communication circuit to the SBU interface; and providing the protocol-specific data received from the SBU interface to the selected communication circuit.

13. The method of claim 12, further comprising:

selecting a plurality of selected communication circuits among the plurality of communication circuits to transmit and receive the protocol-specific data over the SBU interface based on a plurality of specified communication protocols, respectively;

multiplexing the protocol-specific data corresponding to each of the plurality of selected communication circuits and providing the multiplexed protocol-specific data to the SBU interface;

de-multiplexing the protocol-specific data received from the SBU interface into a plurality of de-multiplexed protocol-specific data corresponding to the plurality of selected communication circuits, respectively; and providing the plurality of de-multiplexed protocol-specific data to the plurality of selected communication circuits.

14. A universal serial bus (USB) client, comprising:

a USB Type-C interface configured to couple to a USB host via a USB Type-C cable, wherein the USB Type-C interface comprises a sideband use (SBU) interface and a configuration channel (CC) interface;

a plurality of communication circuits each configured to transmit and receive protocol-specific data based on a specified communication protocol; and a link control circuit communicatively coupled to the USB Type-C interface and the plurality of communication circuits, wherein the link control circuit is configured to:

select a communication circuit among the plurality of communication circuits to transmit and receive the protocol-specific data over the SBU interface based on the specified communication protocol;

configure the SBU interface according to the specified communication protocol of the selected communication circuit;

provide the protocol-specific data received from the selected communication circuit to the SBU interface; and provide the protocol-specific data received from the SBU interface to the selected communication circuit.

15. The USB client of claim 14, wherein the link control circuit is further configured to configure the selected communication circuit to transmit and receive the protocol-specific data over the SBU interface based on a CC alternate mode defined in a USB Type-C Cable and Connector Specification Release 1.1 (USB Type-C specification).

16. The USB client of claim 14, wherein:

the plurality of communication circuits comprises an inter-integrated circuit (I2C) circuit configured to transmit and receive I2C data based on an I2C communication protocol; and the link control circuit is configured to configure the SBU interface to transmit and receive the I2C data according to the I2C communication protocol.

17. The USB client of claim 14, wherein:

the plurality of communication circuits comprises a MIPI Alliance (MIPI) I3C$^{SM}$ (I3C) circuit configured to transmit and receive MIPI I3C data based on a MIPI I3C communication protocol; and the link control circuit is configured to configure the SBU interface to transmit and receive the MIPI I3C data according to the MIPI I3C communication protocol.

18. The USB client of claim 14, wherein:

the plurality of communication circuits comprises a universal asynchronous receiver/transmitter (UART) circuit configured to transmit and receive UART data based on a UART communication protocol; and the link control circuit is configured to configure the SBU interface to transmit and receive the UART data according to the UART communication protocol.

19. The USB client of claim 14, wherein:

the plurality of communication circuits comprises a serial wire debug (SWD) circuit configured to transmit and receive SWD data based on an SWD communication protocol; and the link control circuit is configured to configure the SBU interface to transmit and receive the SWD data according to the SWD communication protocol.

20. The USB client of claim 14, wherein:

the plurality of communication circuits comprises a USB Release 1.1 (USB 1.1) circuit configured to transmit and receive USB 1.1 data based on a USB 1.1 communication protocol; and the link control circuit is configured to configure the SBU interface to transmit and receive the USB 1.1 data according to the USB 1.1 communication protocol.

21. The USB client of claim 14, wherein the link control circuit comprises a link protocol selection circuit configured to select the communication circuit among the plurality of communication circuits to transmit and receive the protocol-specific data over the SBU interface based on the specified communication protocol.

22. The USB client of claim 21, wherein the link control circuit comprises an input/output (I/O) controller configured to:

configure the SBU interface according to the specified communication protocol of the selected communication circuit;

provide the protocol-specific data received from the selected communication circuit to the SBU interface; and provide the protocol-specific data received from the SBU interface to the selected communication circuit.

23. The USB client of claim 22, wherein the link protocol selection circuit is further configured to select a plurality of selected communication circuits among the plurality of communication circuits to transmit and receive the protocol-specific data over the SBU interface based on a plurality of specified communication protocols, respectively.

24. The USB client of claim 23, wherein the I/O controller is further configured to:
- multiplex the protocol-specific data corresponding to each of the plurality of selected communication circuits and provide the multiplexed protocol-specific data to the SBU interface;
- de-multiplex the protocol-specific data received from the SBU interface into a plurality of de-multiplexed protocol-specific data corresponding to the plurality of selected communication circuits, respectively; and
- provide the plurality of de-multiplexed protocol-specific data to the plurality of selected communication circuits.

25. The USB client of claim 14, wherein
the link control circuit comprises a USB Release 3.1 (USB 3.1) controller configured to communicate a USB 3.1 control signal via the SBU interface.

26. The USB client of claim 25, wherein the USB 3.1 controller is further configured to communicate the USB 3.1 control signal as a signal selected from the group consisting of: a wakeup/resume signal; a busy signal; an interrupt signal; a start-of-frame (SOF) signal; and a low-bandwidth endpoint signal.

* * * * *